July 10, 1962         J. E. RAIDEL         3,043,606
VEHICLE WHEEL AXLE MOUNTING UNIT
Filed Oct. 5, 1960                3 Sheets-Sheet 1
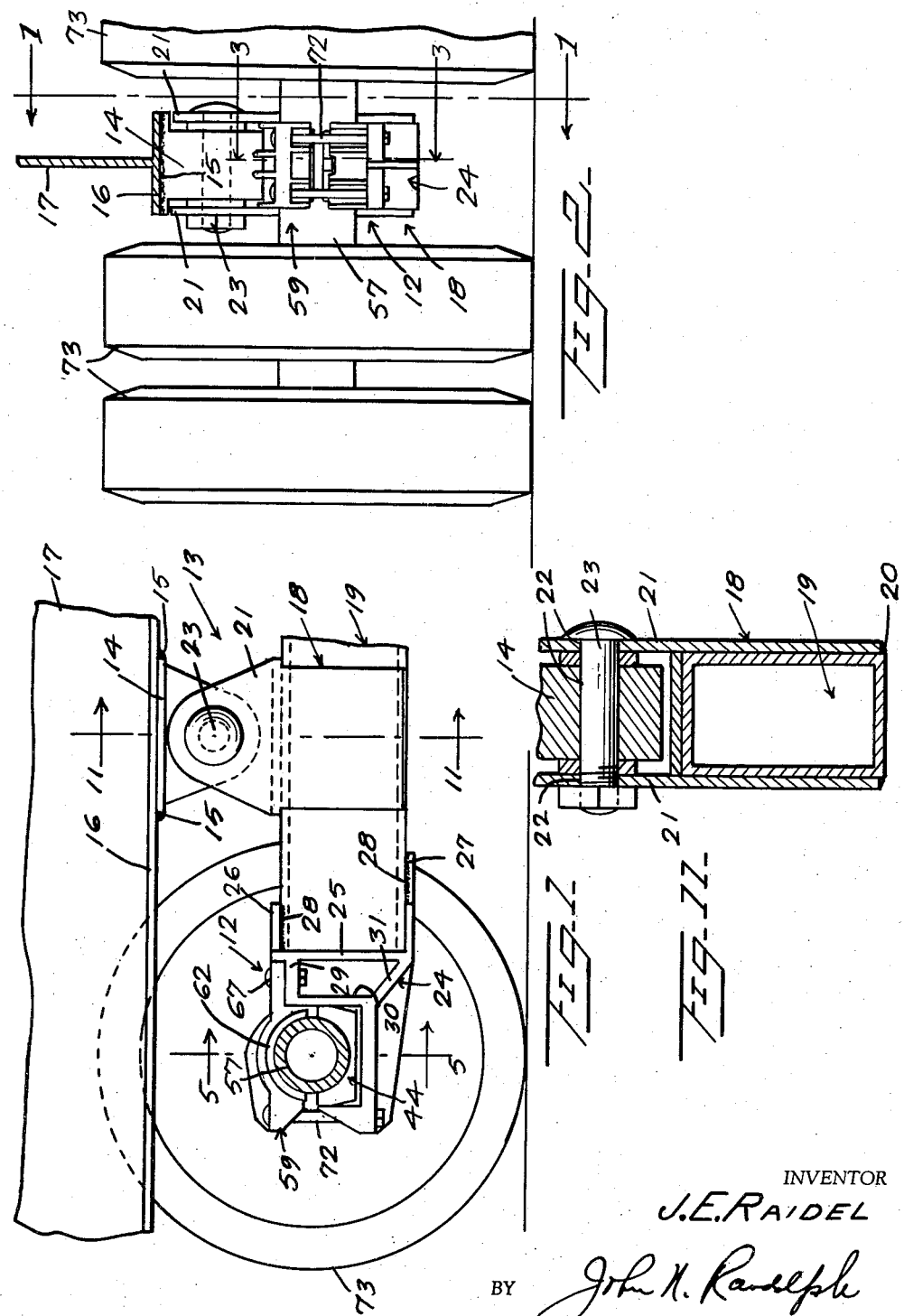
INVENTOR
J.E. RAIDEL
BY John N. Randolph
ATTORNEY July 10, 1962     J. E. RAIDEL     3,043,606
VEHICLE WHEEL AXLE MOUNTING UNIT
Filed Oct. 5, 1960     3 Sheets-Sheet 2
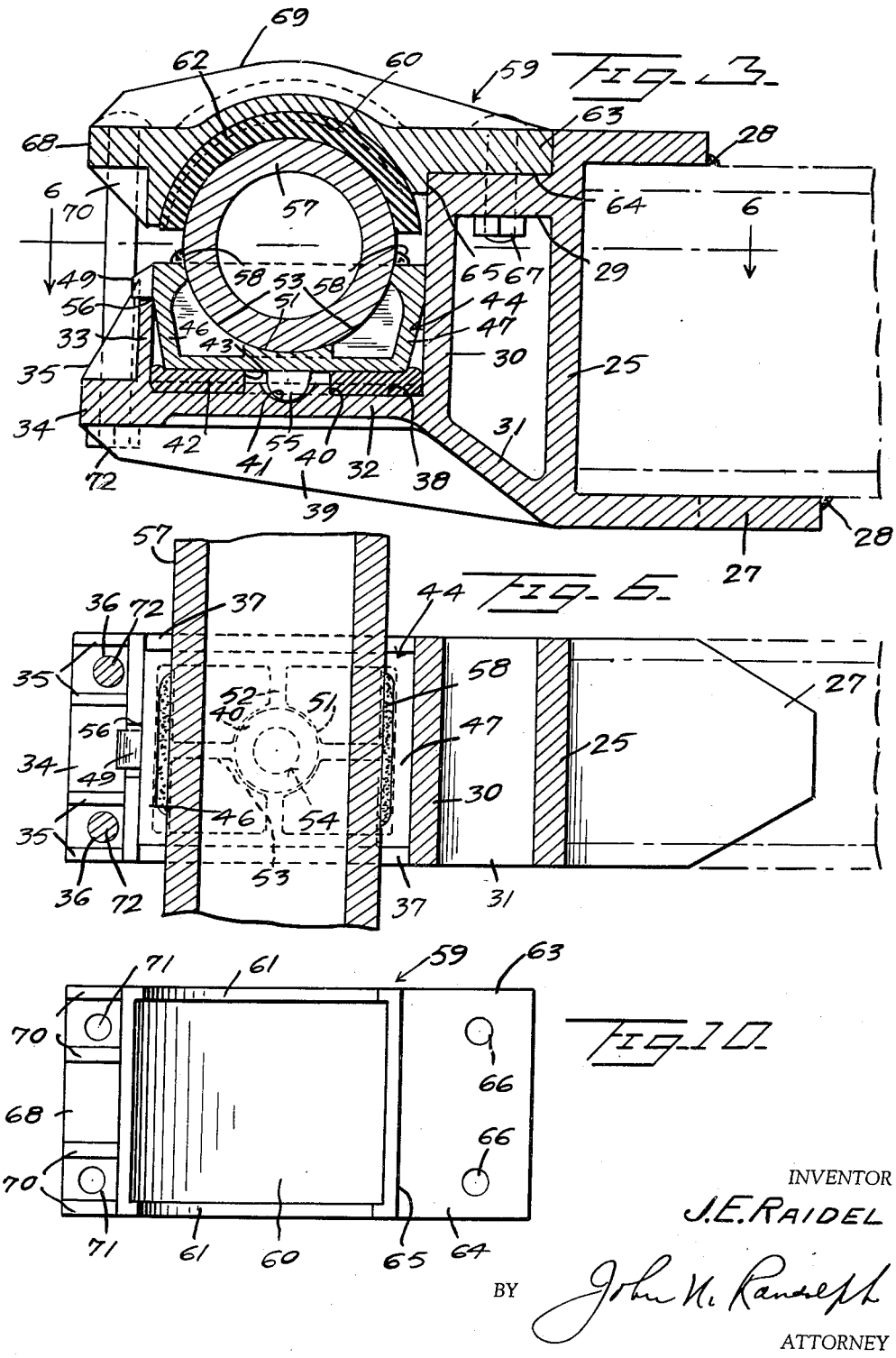
INVENTOR
J.E. RAIDEL
BY John M. Randolph
ATTORNEY July 10, 1962  J. E. RAIDEL  3,043,606
VEHICLE WHEEL AXLE MOUNTING UNIT
Filed Oct. 5, 1960  3 Sheets-Sheet 3
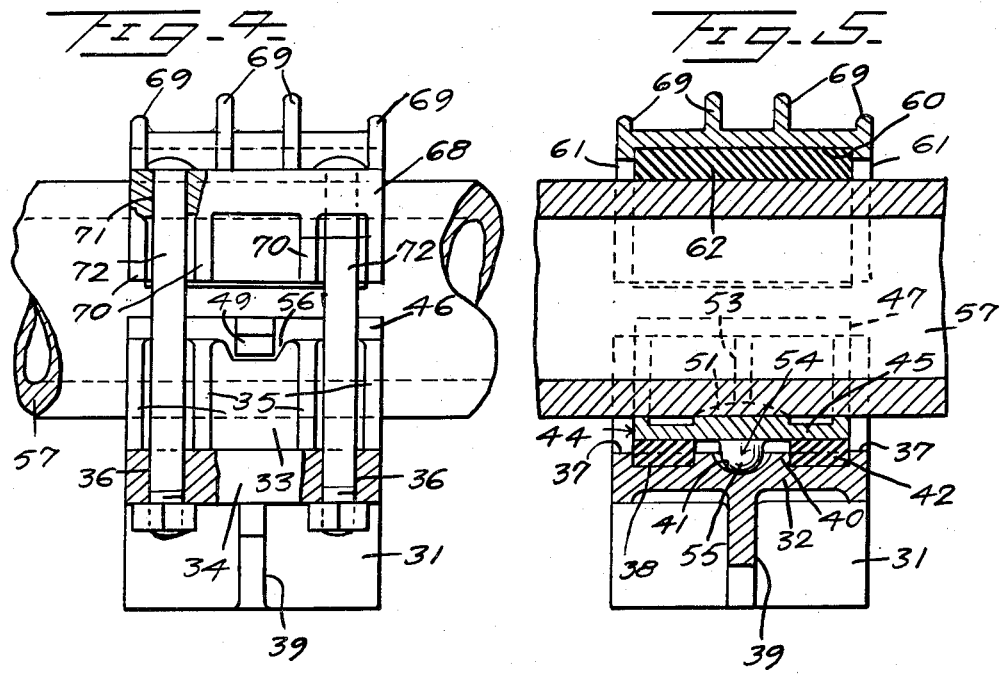
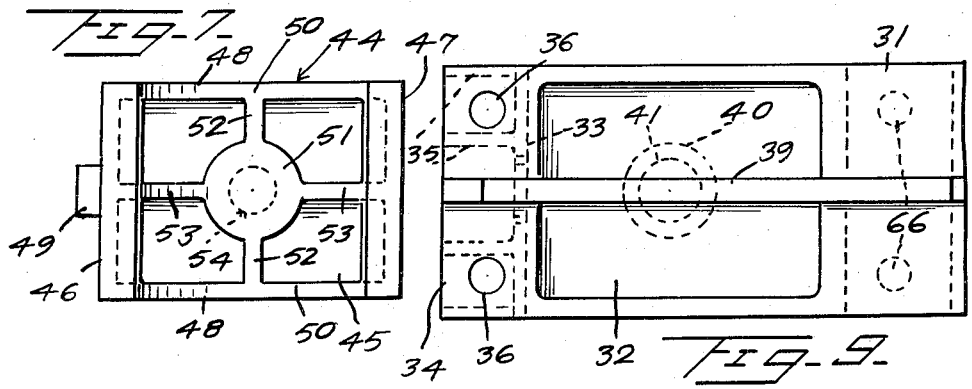
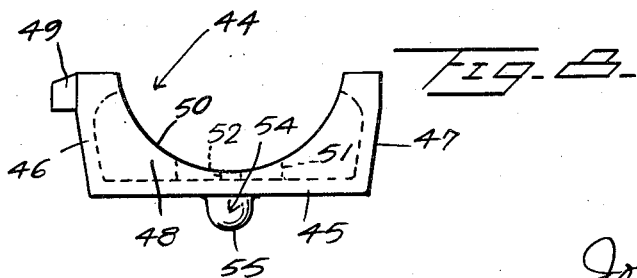
INVENTOR
J.E. RAIDEL
BY John N. Randolph
ATTORNEY United States Patent Office 3,043,606
Patented July 10, 1962

3,043,606
VEHICLE WHEEL AXLE MOUNTING UNIT
John E. Raidel, 15002 Dunton Drive, Whittier, Calif.
Filed Oct. 5, 1960, Ser. No. 60,708
5 Claims. (Cl. 280—104.5)

This invention relates to a unit or assembly for attachment to an end of a rocking beam for connecting a wheel axle to the beam end, so that the wheel axle is disposed parallel to but spaced from the axis about which the beam rocks.

More particularly, it is an object of the present invention to provide an axle mounting unit which may be readily secured to an end of a rocking beam, enabling said unit to be utilized with rocking beams of different lengths to vary the spacing between the wheel axle secured in said unit and the axis about which the beam rocks.

Still another object of the invention is to provide an axle mounting unit which is uniquely constructed so that the wheel axle is detachably mounted in said unit and thus detachably secured to an end of the rocking beam.

Still a further object of the invention is to provide a unit wherein the axle may oscillate to a limited extent relative to said unit and to the rocking beam and about axes which are angularly disposed relative to the axis about which the beam rocks.

Various other objects and advantages of the invention will hereinafter become more fully apparent from the following description of the drawings, illustrating a presently preferred embodiment thereof, and wherein:

FIGURE 1 is a fragmentary longitudinal sectional view, taken substantially along a plane as indicated by the line 1—1 of FIGURE 2, of a portion of a rocking beam suspension for a vehicle and showing one of the axle mounting units associated therewith;

FIGURE 2 is a fragmentary end elevational view thereof, looking from left to right of FIGURE 1;

FIGURE 3 is an enlarged fragmentary longitudinal sectional view taken substantially along a plane as indicated by the line 3—3 of FIGURE 2;

FIGURE 4 is an enlarged end elevational view, partly broken away, of the axle mounting unit, looking toward the outer end thereof or from left to right of FIGURE 1;

FIGURE 5 is an enlarged fragmentary cross sectional view taken substantially along a plane as indicated by the line 5—5 of FIGURE 1;

FIGURE 6 is a horizontal sectional view of the axle mounting unit, taken substantially along a plane as indicated by the line 6—6 of FIGURE 3;

FIGURE 7 is an enlarged top plan view of one element of the axle mounting unit;

FIGURE 8 is a side elevational view of the element shown in FIGURE 7;

FIGURE 9 is a fragmentary bottom plan view of the bottom section of the axle mounting unit;

FIGURE 10 is a bottom plan view of the top section of said unit, and

FIGURE 11 is an enlarged cross sectional view, taken substantially along a plane as indicated by the line 11—11 of FIGURE 1.

Referring more specifically to the drawings, for the purpose of illustrating a preferred application and use of the vehicle wheel axle mounting unit, designated generally 12 and comprising the invention, a portion of an otherwise conventional vehicle wheel suspension, designated generally 13, has been illustrated in FIGURES 1, 2 and 11.

The suspension 13 is of a type employed for supporting trailer chassis intended to carry heavy loads and includes a bracket 14 which is secured in any conventional manner, as by welding, as seen at 15, to the underside of the bottom flange 16 of a longitudinally extending I-beam 17, forming a part of a trailer frame or chassis. A saddle member 18 straddles the intermediate portion of a rocking beam 19 and is secured thereto, as by welding, as seen at 20 in FIGURE 11. The beam 19 is preferably hollow and of rectangular or box shaped cross section. The saddle member 18 has upwardly extending laterally spaced ears or flanges 21 which straddle the downwardly extending bracket 14. The bracket 14 and ears 21 have aligned openings 22 to receive a fastening 23 for pivotally mounting the saddle member and rocking beam beneath the I-beam 17 and for rocking movement about an axis disposed crosswise of said I-beam. The axle mounting unit 12 is shown secured to and extending from one end of the beam 19; however, it will be understood that a second wheel axle mounting unit 12, not shown, will be secured to and project from the other end, not shown, of the beam 19 and that the two units 12 will be spaced equal distances from the rocking beam pivot 23.

The axle mounting unit 12 includes a bottom section, designated generally 24, constituting a single casting having an inner vertical wall 25 and top and bottom flanges 26 and 27, respectively, extending inwardly from the upper and lower ends of said wall 25. The wall 25 abuts an end of the rocking beam 19 and the flanges 26 and 27 straddle and are disposed against top and bottom portions of said beam end. The parts 25, 26 and 27 may be secured rigidly in any suitable manner, as by welding, as seen at 28, to said beam end. The bottom section 24 includes an outwardly extending top wall 29, which is downwardly offset from the top flange 26, and a depending vertical wall 30 which extends downwardly from the outer edge of the wall 29 and which is disposed substantially parallel to the inner wall 25, as best seen in FIGURE 3. A wall or flange 31 extends upwardly at an incline from the bottom edge of the wall 25 to the bottom edge of the wall 30 and a bottom plate 32 extends outwardly from said flange 31 and the wall 30 and is disposed substantially parallel to the flanges 26 and 27 and upwardly offset relative to said flange 27. A front wall 33 extends upwardly from the forward edge of the bottom plate 32 and is disposed forwardly of and substantially parallel to the vertical wall 30 and terminates substantially below the upper edge of said wall 30. The section 24 includes a forwardly extending projection 34 which extends forwardly from the bottom wall 32 to the lower portion of the front wall 33 and which is substantially thicker than the bottom 32. The projection 34 is reinforced by upwardly extending webs 35 which also merge with the outer side of the front wall 33, and said projection 34 is provided with openings 36 which are located between certain of the reinforcing webs 35. The bottom plate 32 is provided with upstanding side flanges 37 which extend upwardly only a slight distance and which extend between the walls 30 and 33 and combine therewith to form a recess 38 in the upper side of the bottom plate 32. The bottom section 24 also includes a bottom reinforcing flange 39 which extends downwardly from the undersides of the bottom flange 31, bottom plate 32 and projection 34. The bottom plate 32 has a boss 40 which extends upwardly into the recess 38 and which is centrally disposed relative to the walls 30 and 33 and the flanges 37, and which rises to approximately the same level as said flanges 37. The boss 40 and the bottom plate 32 are provided with an upwardly opening recess 41 forming a socket, for a purpose which will hereinafter be described.

A cushioning pad 42, preferably formed of rubber, fits snugly in the recess 38 of the bottom plate 32 and has a central opening 43 which fits around the projection 40.

The pad 42 is of a thickness substantially greater than the height of the side flanges 37 and projection 40, as seen in FIGURES 3 and 5.

An axle seat member, designated generally 44 and illustrated in FIGURES 7 and 8, includes a substantially flat bottom 45, end walls 46 and 47 and corresponding side walls 48. The end walls 46 and 47 differ from one another only in that the end wall 46 is provided at its upper edge and intermediate of its ends in an outwardly extending projection 49. The side walls 48 have corresponding arcuate recesses 50 which open upwardly and which extend downwardly to adjacent the upper surface of the bottom 45 and lengthwise to adjacent the end walls 46 and 47. The upper side of the bottom 45 is provided with an upstanding central projection 51 and with aligned transverse webs 52 and with longitudinal webs 53 which are disposed in alignment with one another. The webs 52 extend upwardly to the bottommost portions of the recesses 50, as seen in FIGURE 8, and the upper surface of the central projection 51 and the longitudinal webs 53 are concavely arched to conform to the curvature of the recesses 50. The underside of the bottom 45 is provided with a centrally disposed depending projection 54 the bottom portion 55 of which is hemispherical.

The hemispherical portion 55, as seen in FIGURES 3 and 5, engages the socket or recess 41; however, said arcuate socket 41 has a substantially larger radius than the hemispherical portion 55 so that the hemispherical portion fits loosely in the socket. The projection 54 has a depth substantially greater than the depth of the socket 41 so that when the portion 55 thereof is seated in the socket, the underside of the bottom 45 is disposed substantially above the level of the upper surfaces of the projection 40 and flanges 37, with the bottom 45 resting on the pad 42. The thickness of the pad 42 is greater than the depth of the projection 54 so that the pad is compressed by the seat member 44 when the hemispherical portion 55 is in contact with the socket 41, as seen in FIGURES 3 and 5. The end wall 46 is located adjacent the front wall 33, which wall 33 is provided with an upwardly opening notch 56, intermediate of its ends, in which the lug 49 loosely engages, as seen in FIGURES 4 and 6.

The underside of the intermediate portion of an axle 57 rests in the seat member 44 and conformably engages the recessed upper edges 50 of the side walls 48, the upper surface of the projection 51, and the upper edges of the webs 52 and 53. The axle 57 is secured immovably to the seat member 44, as by means of welds 58, as seen in FIGURE 3.

The axle mounting unit 12 also includes a detachable top section 59 in the form of an elongated casting including a concavely arced longitudinally extending underside or bottom portion 60 having slightly depending arcuately bowed side flanges 61, for confining therebetween a relatively thick cushioning pad 62 of rubber or other suitable material which engages conformably against said recessed underside 60 and which extends at least from end-to-end thereof. Said upper section 59 is disposed over the intermediate portion of the axle 57 with the underside of the pad 62 resting thereon. The thickness of the pad 62 is substantially greater than the thickness of the flanges 61, so that the flanges 61 are spaced from the periphery of the axle 57.

The detachable upper section 59 includes an inner portion which is disposed inwardly with respect to the recessed portion 60 which defines a mounting flange 63. The flange 63 has a flat bottom surface 64 which rests flush upon the upper surface of the top wall 29. The flange 63 has an inwardly facing shoulder 65 which extends downwardly from the bottom surface 64 and which abuts the upper portion of the vertical wall 30. The wall 29 and flange 63 have aligned openings 66, as seen in FIGURES 9 and 10, to receive nut and bolt fastenings 67 by which the flange 63 is secured on the wall 29. The upper section 59 has a front portion 68 extending across the forward end thereof and is provided with a plurality of upper reinforcing webs 69 extending from end-to-end thereof, and a plurality of bottom reinforcing webs 70 which extend downwardly and inwardly from the underside of said front portion 68. The front portion 68 is provided with openings 71 which are located between the webs 69 and 70 and which align with the openings 36, as seen in FIGURE 4, to receive nut and bolt fastenings 72, which extend through the aligned openings 71 and 36 and which combine with the fastenings 67 to secure the upper section 59 detachably but rigidly to the lower section 24, for confining the intermediate portion of the axle 57 within the mounting unit 12, and the seat member 44 within the lower section 24.

A pair of ground engaging wheels 73 is journaled on each end of the axle 57, so that the pairs of wheels 73 straddle the axle mounting unit 12 and the end of the beam 19, to which said unit is secured. It will be understood that a corresponding unit 12 will be secured to the other end, not shown, of the beam 19 for supporting another axle on each end of which is journaled a pair of wheels. Furthermore, the vehicle wheel suspension 13, including the two units 12, the two axles and the four pairs of wheels, constitutes one of a plurality of wheel suspensions which are disposed in transverse alignment with one another for supporting the trailer.

It will be readily apparent that a pair of the axle mounting units 12 can be applied to the ends of beams of different lengths for varying the spacing between the centers of the axles mounted therein and the rocking beam pivot 23. It will be obvious that the pivot 23 permits up and down rocking movement of the ends of the beam 19, so that the axle 57 has vertical rocking movement about the pivot 23 and the wheels 73, journaled on said axle, are capable of up and down swinging movement in passing over humps or depressions in a roadway.

In addition, the lower pad 42 permits a limited rocking movement of the seat member 44 relative to the bottom section 24, about an axis disposed substantially crosswise of the axle 57, so that the axle ends and the wheels carried thereby may rock upwardly and downwardly to a limited extent relative to the mounting unit 12 and beam 19. Thus, one pair of the wheels 73 of the axle 57 can move upwardly or downwardly and relative to the other pair of wheels, which are moved in the opposite direction, for passing over humps or depressions. This limited rocking movement of the axle in its mounting 12 is permitted by the resiliency of the pads 42 and 62 and due to the fact that the hemispherical portion 54 can turn and slide in the socket 41. The loose fitting engagement of the lug 49 in the notch 56 will not interfere with said rocking movement of the seat member 44, but will prevent the seat member 44 from moving sufficiently relative to the bottom section 24 so that the hemispherical portion 55 could become disengaged from the socket 41.

Various modifications and changes are contemplated and may be resorted to, without departing from the function or scope of the invention as hereinafter defined by the appended claims.

I claim as my invention:

1. In combination with a tandem wheel suspension for a trailer vehicle including a beam disposed longitudinally beneath the trailer and connected to a frame member thereof for rocking movement about a horizontal axis disposed crosswise of said beam and trailer and midway of the beam ends; a wheel axle mounting unit comprising a lower section rigidly secured to and projecting from an end of the beam and having an outer portion disposed beyond said beam end and defining an upwardly facing support rigidly disposed with respect to the beam, a seat member engaging removably in said support and having an upwardly facing arcuately recessed seat disposed crosswise of the beam and said axle mounting unit and in which the underside of an intermediate portion of an axle is adapted to conformably seat, means securing said axle portion immovably to said seat member, said axle mounting unit including an upper section extending over the axle and disposed directly above said lower section, fastening means detachably securing said upper section rigidly to the lower section, said upper section including an intermediate portion bridging the intermediate portion of the axle and disposed substantially concentrically around an upper part thereof and spaced therefrom, said support and seat member having interengaging means functioning in cooperation with said upper section, when secured by the fastenings thereof to the lower section, for retaining the seat member in engagement with the support and for limited rocking movement relative thereto about an axis disposed approximately crosswise of said axle for oscillating movement of the axle with said seat member relative to the beam and axle mounting unit, an upper cushioning member disposed between said intermediate portion of the upper section and the axle, and a cushioning pad disposed between and engaged by the seat member and support and cooperating with the cushioning member to yieldably resist rocking movement of the axle and seat member relative to the axle mounting unit, said seat member having a substantially flat bottom resting on said cushioning pad, said pad having an opening, said support having an upwardly facing socket disposed in the pad opening, and said seat member having a projection depending from the bottom thereof including a lower end engaging loosely in said socket, said projection and socket forming parts of said interengaging means.

2. In a combination as defined by claim 1, said support including an upwardly extending outer end wall terminating beneath and spaced from a part of said upper section and having an upwardly opening notch, and said seat member having a lug engaging in said notch and having limited movement relative thereto in directions lengthwise of the axle, said lug and notch forming additional parts of said interengaging means.

3. In a combination as defined by claim 2, said lower portion of the projection being substantially hemispherical, and said socket being dished and having a radius greater than the radius of said hemispherical portion.

4. In combination with a tandem suspension for a trailer vehicle including a beam disposed longitudinally beneath the vehicle and connected thereto for rocking movement about a horizontal axis disposed crosswise of said beam and vehicle and midway of the beam ends; a wheel axle mounting unit comprising a lower section rigidly secured to and projecting from an end of the beam and including spaced flanges defining a recessed inner end of the lower section and between which said beam end is secured, an upper section, fastening means rigidly securing said upper section to a portion of the lower section disposed beyond said recessed inner end for detachably mounting the upper section directly above said portion of the lower section, said portion of the lower section and said upper section having vertically spaced portions disposed beyond and spaced from said beam end through which an intermediate portion of a wheel axle extends for positioning the wheel axle crosswise of said mounting unit and beam, a seat member supported by said portion of the lower section and having a recessed upper side in which a lower portion of the axle seats, means securing said seat member rigidly to the axle, said portion of the lower section and seat member having interengaging means functioning with the upper section, when secured to the lower section, for retaining the seat member in engagement with the mounting unit and for limited rocking movement relative thereto about an axis disposed approximately crosswise of the axle for oscillating movement of the axle relative to the beam and axle mounting unit with said seat member, a cushioning pad yieldably engaging between parts of said portion of the lower section and seat member to resist rocking movement of the seat member relative to said lower section, and a cushioning member engaging yieldably between said upper section and an upper part of the axle for yieldably resisting rocking movement of the axle relative to said upper section.

5. In combination with a tandem wheel suspension for a trailer vehicle including a beam disposed longitudinally beneath the trailer and connected to a frame member thereof for rocking movement about a horizontal axis disposed crosswise of said beam and trailer and midway of the beam ends; a wheel axle mounting unit comprising a lower section rigidly secured to and projecting from an end of the beam and including spaced flanges between which said beam end is secured and defining a recessed inner end of the lower section, said lower section having an outer portion spaced outwardly from said beam end and defining an upwardly facing support rigidly disposed with respect to the beam, a seat member engaging removably in said support and having an upwardly facing arcuately recessed seat disposed crosswise of the beam and of said axle mounting unit and in which the underside of an intermediate portion of an axle is adapted to conformably seat, means securing said axle portion immovably to said seat member, said axle mounting unit including an upper section extending over the axle and disposed directly above said upwardly facing support, fastening means detachably securing said upper section rigidly to said upwardly facing support, said upper section including an intermediate portion bridging the intermediate portion of the axle and disposed substantially concentrically around an upper part thereof and spaced therefrom, said upwardly facing support and seat member having interengaging means functioning in cooperation with said upper section, when the latter is secured to the lower section, for retaining said seat member in engagement with the upwardly facing support and for limited rocking movement relative thereto about an axis disposed approximately crosswise of said axle for oscillating movement of the axle with said seat member relative to the beam and axle mounting unit, an upper cushioning member disposed between said intermediate portion of the upper section and the axle, and a cushioning pad disposed between and engaged by the seat member and upwardly facing support and cooperating with the cushioning member to yieldably resist rocking movement of the axle and seat member relative to the axle mounting unit.

References Cited in the file of this patent

UNITED STATES PATENTS

| | | |
|---|---|---|
| 2,743,936 | Bigge | May 1, 1956 |
| 2,907,579 | Masser | Oct. 6, 1959 |

FOREIGN PATENTS

| | | |
|---|---|---|
| 1,009,064 | France | Feb. 27, 1952 |
| 1,017,922 | Germany | Oct. 17, 1957 |